United States Patent
Higashitani

(10) Patent No.: US 7,616,351 B2
(45) Date of Patent: Nov. 10, 2009

(54) IMAGE READING DEVICE

(75) Inventor: Masahiro Higashitani, Osaka (JP)

(73) Assignee: Kyocera Mita Corporation (JP)

( * ) Notice: Subject to any disclaimer, the term of this patent is extended or adjusted under 35 U.S.C. 154(b) by 494 days.

(21) Appl. No.: 11/527,203

(22) Filed: Sep. 26, 2006

(65) Prior Publication Data

US 2007/0076274 A1 Apr. 5, 2007

(30) Foreign Application Priority Data

Sep. 30, 2005 (JP) ............................. 2005-288917

(51) Int. Cl.
*H04N 1/04* (2006.01)
*H04N 1/38* (2006.01)
*H04N 1/40* (2006.01)

(52) U.S. Cl. .................. 358/461; 358/463; 358/465; 358/474; 358/486; 358/496; 358/498; 358/406

(58) Field of Classification Search ............ 358/461, 358/406, 504, 496, 498, 463, 465, 466, 486; 382/274, 275
See application file for complete search history.

(56) References Cited

U.S. PATENT DOCUMENTS

| 6,563,938 | B1 | 5/2003 | Harada |
| 6,600,579 | B1 * | 7/2003 | Kumagai et al. ............. 358/474 |
| 6,801,670 | B2 * | 10/2004 | Kijima et al. ............... 382/274 |
| 2003/0016398 | A1 * | 1/2003 | Soeda ......................... 358/461 |
| 2005/0179954 | A1 * | 8/2005 | Arai et al. ................. 358/3.26 |
| 2008/0018958 | A1 * | 1/2008 | Kurokawa ................. 358/474 |

* cited by examiner

*Primary Examiner*—Cheukfan Lee
(74) *Attorney, Agent, or Firm*—Gerald E. Hespos; Anthony J. Casella

(57) ABSTRACT

By reading an image of a reference plate, whether or not a likeliness that a linear abnormal image is occurred in the image of the document due to a foreign matter and the like attached on a contact glass exists is determined. In the case where there is the likeliness of occurrence of the linear abnormal image, the occurrence of the abnormal image is suppressed by changing an image reading position. At this time, a reading sensitivity is measured by reading a reference document having a single white color instead of a normal document. An adjustment data is generated according to the measurement result and stored in a memory. Then, light quantity of an exposure lamp is regulated in accordance with the document reading position by using the adjustment data.

10 Claims, 9 Drawing Sheets

FIG.7A
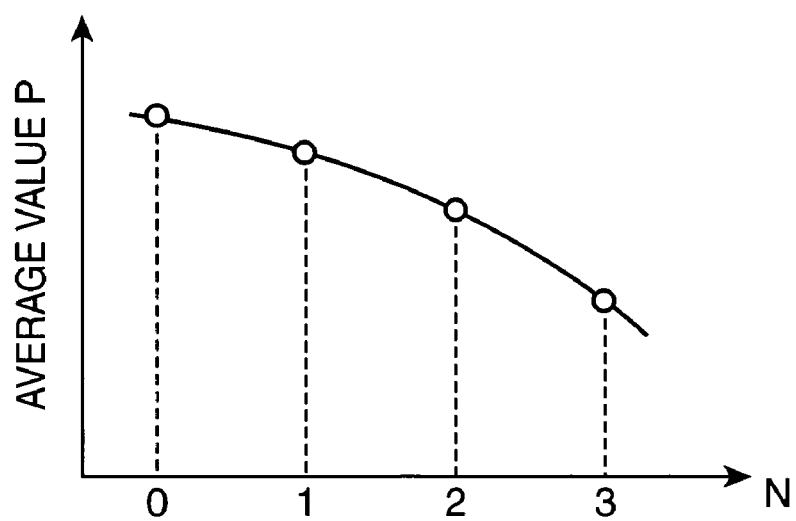
FIG.7B
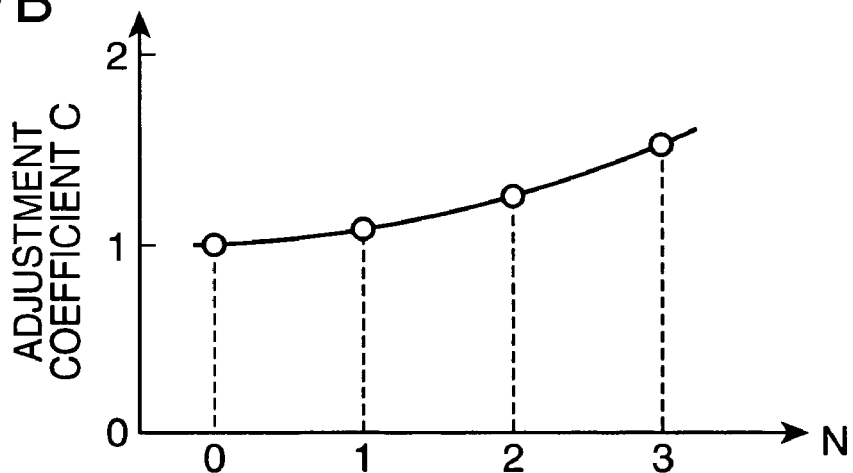
FIG.7C
| N | SHEET #1 | SHEET #2 | SHEET #3 |
|---|---|---|---|
| 0 | 1 | 1 | 1 |
| 1 | 1.05 | 1.02 | 1.01 |
| 2 | 1.15 | 1.06 | 1.03 |
| 3 | 1.30 | 1.12 | 1.06 |

IMAGE READING DEVICE

BACKGROUND OF THE INVENTION

1. Field of the Invention

The present invention relates to a so-called sheet-through type image reading device for reading an image of a document so conveyed as to move in a sub-scanning direction on one principal surface of a transparent plate at the other principal surface side of the transparent plate.

2. Description of the Related Art

When an image of a document is read by using a sheet-through type image reading device and printed out by using a printer or is captured in a personal computer and displayed on a display, a linear abnormal image sometimes appears in the image along a sub-scanning direction. This is caused when a foreign matter such as dirt, powder dust or a piece of paper sheet of a conveyed document is attached to a contact glass of the image reading device. The linear abnormal image appears on a white background base portion in a form of a black line or appears on an image portion in a form of a white line. These linear abnormal images are visually eye-catching.

As a technology to suppress occurrence of such linear abnormal image, a technology disclosed in Japanese Patent No. 3337993 is known. According to the conventional technology, a reference plate so positioned as to extend in a main scanning direction at a document reading position is read before a document is read. Then, whether or not the abnormal image is included in an obtained image of the reference plate is determined. If the abnormal image is included, a document reading position is moved along a sub-scanning direction. If an abnormal image is identified at a newly set document reading position, the document reading position is further changed. Consequently, the conventional technology suppresses occurrence of the linear abnormal image appeared on an image of the read document.

However, according to the conventional technology, an image is read at a position displaced from the most preferable and proper position in design since the document reading position is changed. Accordingly, a degree of reading sensitivity, i.e. intensity (i.e. pixel value) of an image obtained from a specified document, is deviated from the most preferable value in design. Consequently, there has been a problem that a background fogging (a phenomenon in which a mist-like coloring occurs in an area initially having a white background) appears on an image obtained by reading a document and a problem that coloring is changed slightly in a color image.

Further, many of the sheet-through type image reading devices are positioned such that a document is fed over a contact glass while bending the document back at a roller so that a document feeding-in position and a document feeding-out position are approximately on the same line. Accordingly, the image reading device is made smaller in size. Since the document is fed over the contact glass while being bent back, the document moves on the contact glass while being curved. Accordingly, when the document reading position is changed, a distance and angle of the document sheet with respect to the contact glass changes. Accordingly, a reading sensitivity is sensitively changed by the change in the document reading position so that its effect is sensitively reflected in an image quality of a document image. Especially, in the case of a document sheet having a high reflectivity such as a glossy paper sheet, the effect becomes more prominent.

SUMMARY OF THE INVENTION

An object of the present invention is to provide an image reading device capable of suppressing changes in image quality and occurrence of a linear abnormal image.

An image reading device according to one aspect of the present invention is adapted for reading an image of a document so conveyed as to move in a sub-scanning direction on one principal surface of a transparent plate at the other principal surface side of the transparent plate by a reflected light ray of a light source and includes: a reference plate provided facing the one principal surface of the transparent plate, and extending in a main scanning direction; an abnormality determining portion for determining whether or not there is an abnormality in an image that is obtained by reading the reference plate without conveying a document; a reading position setting portion for changing a document reading position along the sub-scanning direction within a range allowing reading of the reference plate when the abnormality determining portion determines that there is an abnormality; an adjustment data storing portion for storing an adjustment data to compensate a difference in the reading sensitivity due to a different document image reading position; and a sensitivity setting portion for adjusting the reading sensitivity in accordance with the document reading position based on the adjustment data.

According to the image reading device, occurrence of a linear abnormal image can be suppressed while a change in image quality is suppressed.

These and other objects, features, aspects, and advantages of the present invention will become more apparent from the following detailed description of the preferred embodiments/examples with reference to the accompanying drawings.

BRIEF DESCRIPTION OF THE DRAWING

FIGS. 7A through 7C are explanatory diagrams for describing an operation of the adjustment data generating portion in FIG. 4.

DETAILED DESCRIPTION OF THE PREFERRED EMBODIMENT

Figure 1:
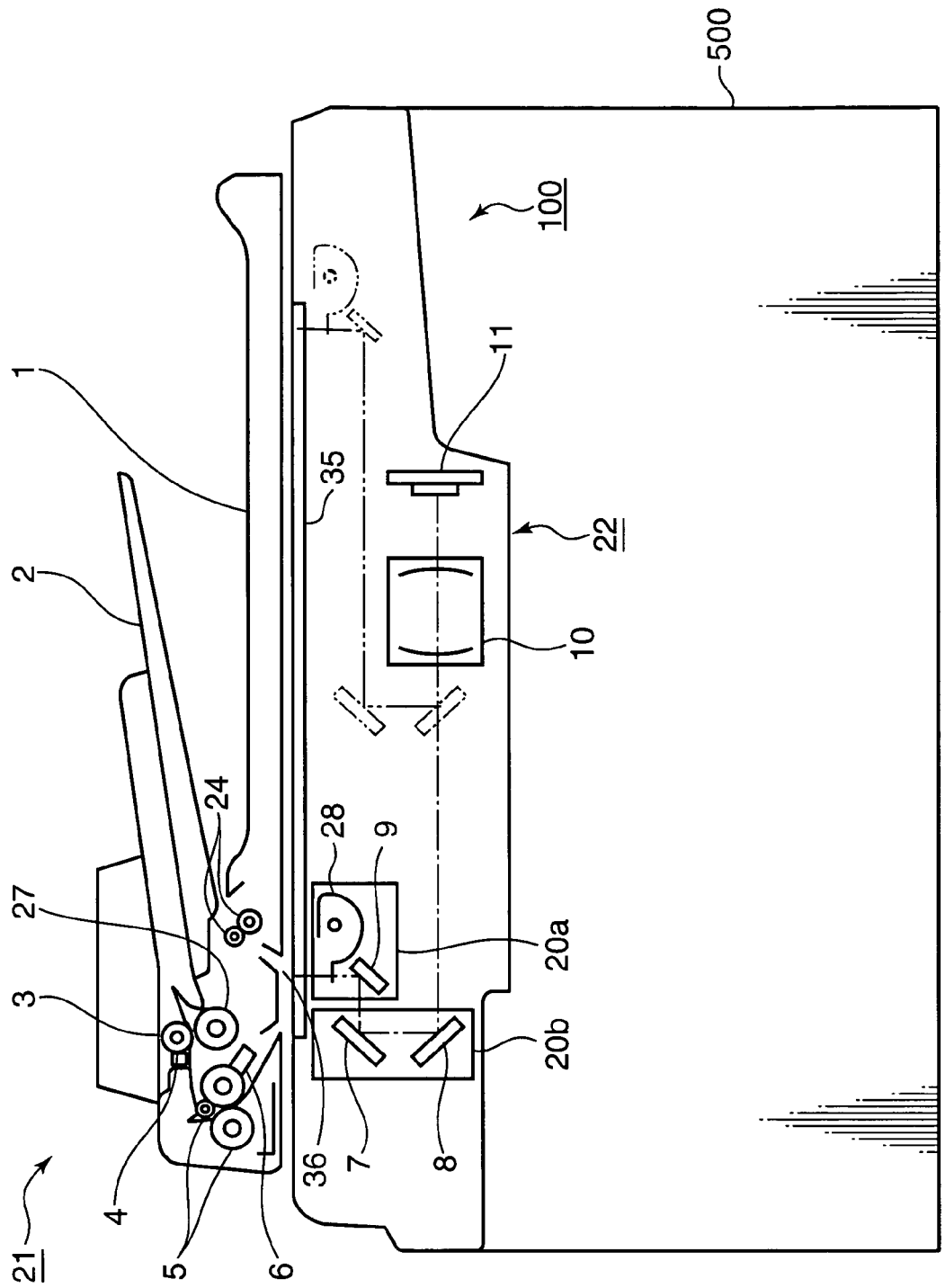
FIG. 1 is a schematic sectional view mainly showing a mechanical and optical construction of a scanner section constituting a part of an image reading device according to an embodiment of the present invention.
Figure 2:
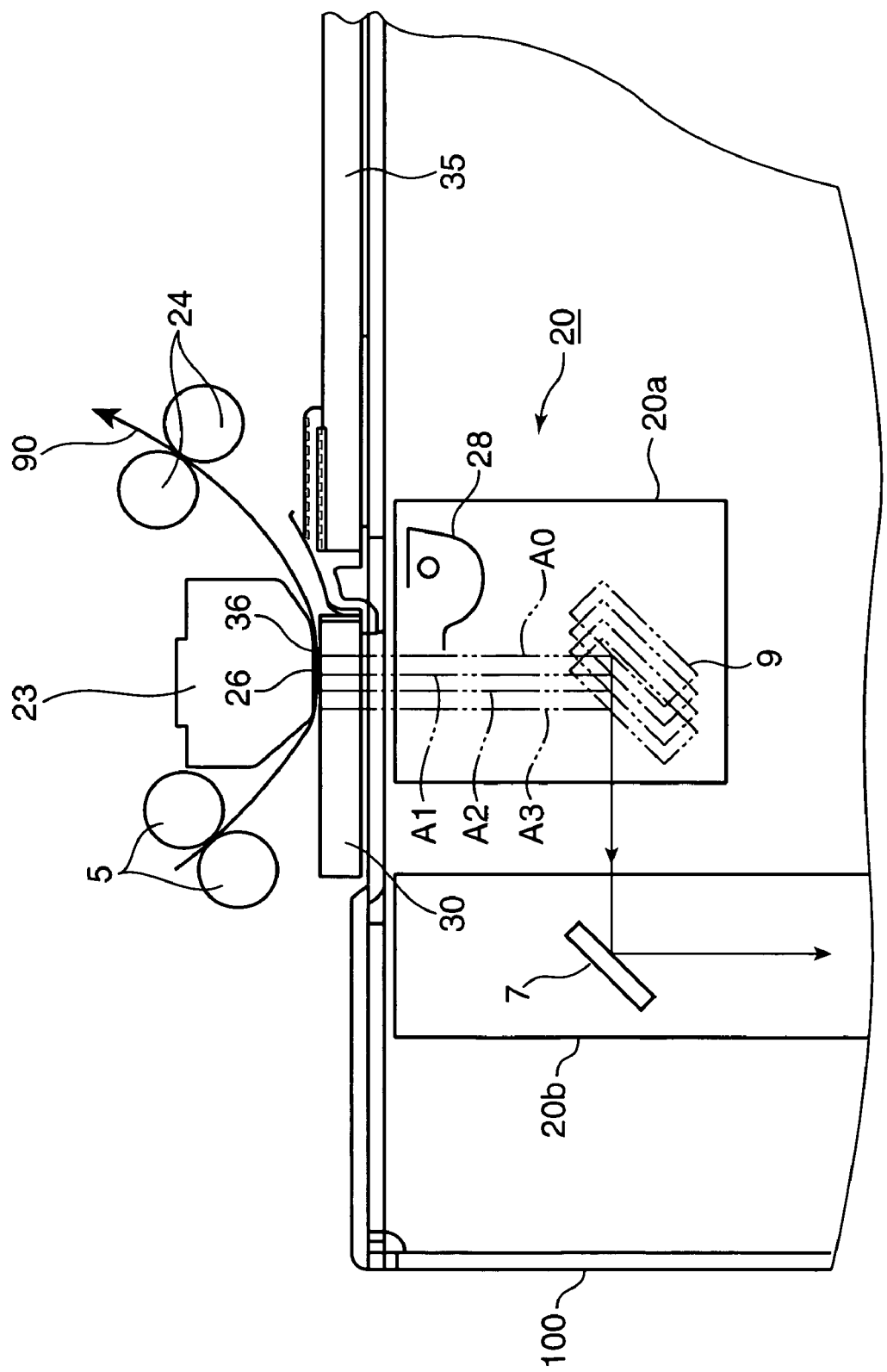
FIG. 2 is an enlarged schematic sectional view of the scanner section showing an enlarged view of a part of FIG. 1.

FIGS. 1 and 2 are schematic sectional views mainly showing a mechanical and optical construction of a scanner section constituting a part of an image reading device according to an embodiment of the present invention. FIG. 2 corresponds to a partial enlarged view of FIG. 1. This image reading device 500 is embodied as a copying machine having not only an image reading function, i.e. scanner function, but also having a printer function. A scanner section 100 constituting a part of the image reading device 500 includes a sheet feeding portion (document feeder) 21 and a main body 22.

The sheet feeding portion 21 is openably and closably mounted on an upper face of the main body 22 and includes a document feeding-out table 1, a document feeding-in table 2, a sheet feeding roller 3, a registration switch 4, a pair of registration rollers 5, a timing switch 6, a pair of feeding-out rollers 24, a document pressing member 23 and a reference plate 26. The main body 22 includes a first mirror 9, a second mirror 7, a third mirror 8, a lens system 10, a CCD image capturing device 11, an exposure lamp 28, a contact glass 30 and a contact glass 35. The exposure lamp 28 corresponds to one example of a light source of the present invention, and the contact glass 30 corresponds to one example of a transparent plate of the present invention. Further, the sheet feeding section 21 corresponds to one example of a document feeding section.

A plurality of documents 90 placed on the document feeding-in table 2 is separated one sheet from another successively by the sheet feeding roller 3 and a separating roller 27 positioned in a pair. Then, the pair of registration rollers 5 constituting a part of the sheet feeding roller feeds the document 90 to a document reading position 36 predetermined between the document pressing member 23 and the contact glass 30. During the document 90 moves through the document reading position 36, an optical system provided in the main body 22 reads an image of the document 90 facing the contact glass 30. After passing through the document reading position 36, the document 90 is fed out to the document feeding-out table 1 by the pair of discharging rollers 24. The registration switch 4 and the registration rollers 5 also serve to adjust a leading edge of the document 90 before the document 90 is fed to the document reading position 36. The timing switch 6 is adapted for determining a timing of a leading end of image during a document is fed. A signal obtained from the timing switch 6 is transmitted to a controller 400 (refer to FIGS. 3 and 4) provided in the image reading device 500.

Accordingly, the sheet feeding portion 21 bends back the document 90 by the registration rollers 5 and feeds the same to the document reading position 36 so that the document feeding-in table 2 and the document feeding-out table 1 are approximately overlapping. Consequently, it is made possible to make a width of the sheet feeding section 21 narrow to thereby construct the image reading device 500 to be compact.

A light ray is irradiated from the exposure lamp 28 and passed through the contact glass 30 so as to illuminate the document reading position 36. Consequently, a light ray reflected from the document 90 on the document reading position 36 passes through the contact glass 30 and is irradiated to the first mirror 9. After passing through the second mirror 7, the third mirror 8 and the lens system 10, the light ray is irradiated to the CCD image capturing device 11. The CCD image capturing device 11 are arranged in a main scanning direction (a direction perpendicular to a respective sheet of FIGS. 1 and 2) and are adapted for obtaining an image of one line in the main scanning direction simultaneously. (Hereinafter, "an image data" is appropriately recited as "an image" in accordance with a practice in the field of technology.) The CCD image capturing devices 11 may be arranged along multiple columns so as to be capable of obtaining images of plurality of lines simultaneously.

During the CCD image capturing devices 11 read an image of the document 90 at the document reading position 36, the document 90 is moved in a sub-scanning direction (a horizontal direction in FIGS. 1 and 2). Accordingly, when a sheet of the document 90 is stored in the document discharging table 1, scanning of a whole image of one sheet of the document 90 in the main scanning direction and in the sub-scanning direction is completed.

The scanner section 100 is so constructed as to be capable of reading an image of the document 90 by opening the sheet feeding section 21 in an upper direction of the main body 22 and placing the document 90 one after another on the other contact glass 35 without using the sheet feeding portion 21. For this purpose, a part of the optical system is mounted on moving frames 20a, 20b so as to be movable along a principal surface of the contact glass 35. Namely, the exposure lamp 28, the first mirror 9, the second mirror 7 and the third mirror 8 are mounted on moving frames 20a, 20b and are moved as the moving frames 20a, 20b move. On the other hand, the lens system 10 and the CCD image capturing devices 11 are not mounted on the moving frames 20a, 20b but retained on parts of the main body 22 other than the moving frames 20a, 20b.

Further, the exposure lamp 28 and the first mirror 9 are mounted on the moving frame 20a, and the second mirror 7 and the third mirror 8 are mounted on the moving frame 20b. Following the movement of the moving frame 20a, the moving frame 20b moves only a half a distance the moving frame 20a moves. The second mirror 7 and the third mirror 8 move half a distance the exposure lamp 28 and the first mirror 9 move. Accordingly, a distance of a path of the reflected light ray of the exposure lamp 28 from the first mirror 9 to the lens system 10 is maintained constant regardless of a position of the moving frames 20.

Following the movement of the exposure lamp 28 and the first mirror 9, the document image reading position 36 moves along the sub-scanning direction. Accordingly, the CCD image capturing device 11 can read an image of the document 90 placed still on upper face of the contact glass 35 in the main scanning direction and in the sub-scanning direction.

As shown in FIG. 2, it should be noted that the moving frames 20 are movable even if an image is read through the contact glass 30 while the document 90 is fed by the sheet feeding portion 21. Accordingly, the document reading position 36 is changeable along an upper face of the contact glass 30. Such construction can be easily realized by diverting a construction that the scanner section 100 includes the moving frames 20 capable of reading an image of the document 90 placed on an upper face of the contact glass 35.

The image reading device 500 determines whether or not there is a likeliness that the linear abnormal image occurs in an image of the document due to a foreign matter and the like attached to the contact glass 30 by reading an image of a reference plate 26. If there is a likeliness that that the abnormal image occurs, occurrence of such linear abnormal image is suppressed by changing the document reading position 36. The reference plate 26 is a plate-like member attached to a side of the document pressing member 23 facing the contact glass 30 and has a white colored surface at least on a surface facing the contact glass 30.

For example, as shown in FIG. 2, the document reading position 36 can be changed among four positions along the sub-scanning direction. In the description hereinafter, the four document reading positions 36 are described simultaneously by using reference numerals A0 through A3 correspondingly assigned to the light rays in FIG. 2. An interval among the positions A0 through A3 is set to be 0.52 mm assuming that the effect of a foreign matter having a size of 0.5 mm should be eliminated, for example.

In relation to that a conveyance direction of the document 90 is bent by the registration roller 5, the document 90 passes through a conveyance passage formed between the document pressing member 23 and the contact glass 30 in a state of being curved. Accordingly, if the document reading position 36 is changed, a distance and an angle of a sheet of the document 90 with reference to the contact glass 30 are changed. Consequently, as described in the description of the prior art, the reading sensitivity is sensitively changed depending upon the document reading position 36 so that an image quality of the document image is sensitively affected.

To solve the disadvantage, the image reading device 500 regulates light quantity of the exposure lamp 28 in accordance with the document reading position 36. The image reading device 500 performs adjustment of light quantity based on an adjustment data prepared in advance. The image reading device 500 measures the reading sensitivity by reading a reference document which is the document 90 serving as a reference for measuring the reading sensitivity. Then, the image reading device 500 generates the adjustment data from the measured reading sensitivity and stores the same in a memory. The reference document is, for example, the document 90 having a single white color. Characteristic operation of the image reading device 500 will be described hereinafter.

Figure 3:
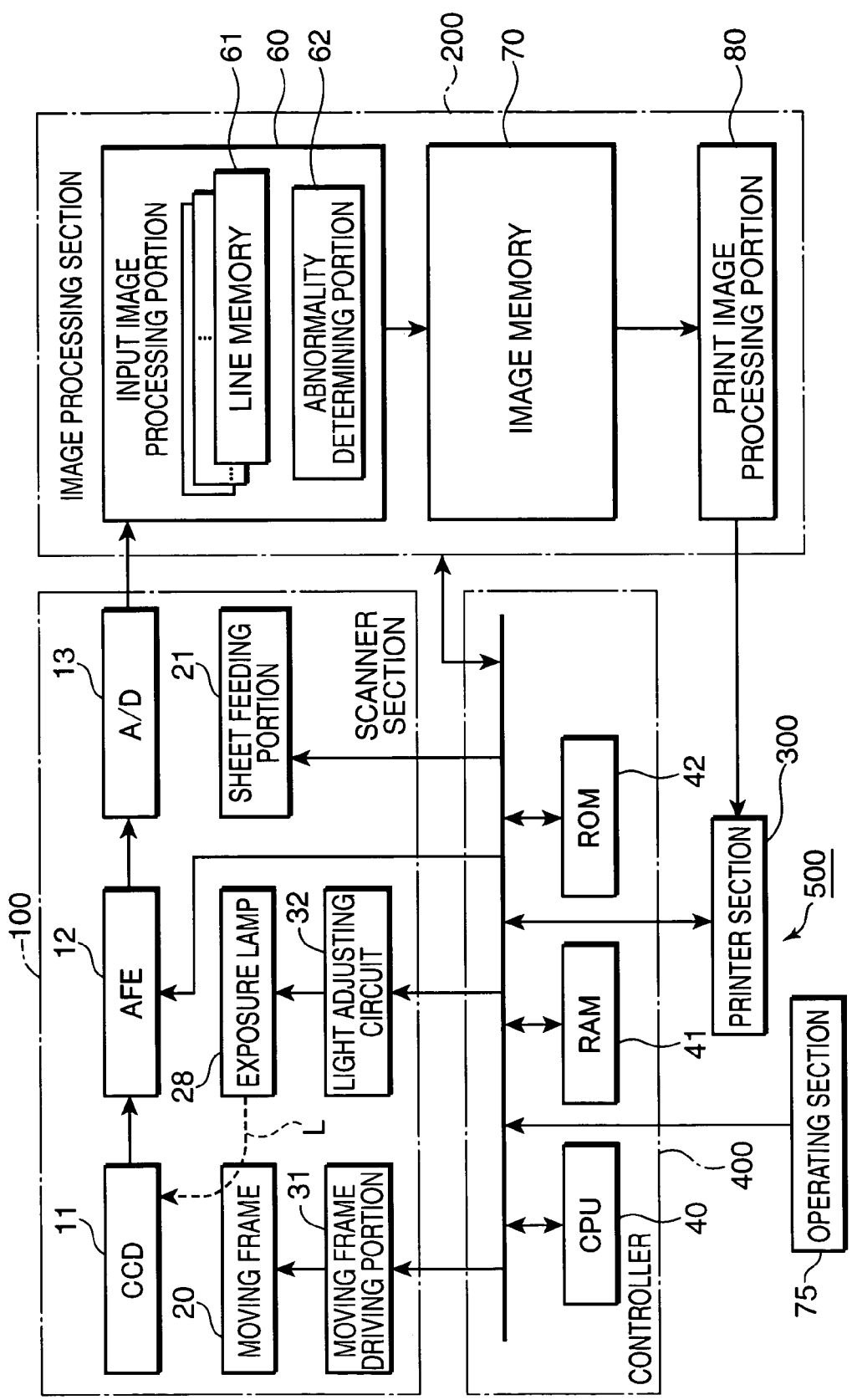
FIG. 3 is a block diagram mainly showing an electric construction of the image reading device according to an embodiment of the present invention.

FIG. 3 is a block diagram mainly showing an electric construction of the image reading device 500. The image reading device 500 includes an image processing section 200, a printer section 300, a controller 400 and an operating section 75 in addition to the aforesaid scanner section 100. The scanner 100 includes an AFE (Analog Front End) 12, an A/D converter (Analog/Digital converting circuit) 13, a moving frame driving portion 31 and a light adjusting circuit 32 in addition to the aforesaid CCD image capturing devices 11, the moving frame 20, the sheet feeding portion 21 and the exposure lamp 28. The AFE 12 is an amplifying circuit for controlling a gain of an electric signal outputted from the CCD image capturing device 11. Namely, the AFT 12 is adapted for performing a gain control. The A/D converter 13 is adapted for converting an electric signal which is an image data amplified in the AFE 12 from an analog format to a digital format. The moving frame driving portion 31 is adapted for driving an unillustrated motor to make the driving frame 20 move in accordance with a control of the controller 400. The light adjusting circuit 32 is a circuit for adjusting a light quantity of the exposure lamp 28 in accordance with a control of the controller 400.

The image processing section 200 includes an input image processing portion 60, an image memory 70 and a print image processing portion 80. The input image processing portion 60 applies various kinds of image processing such as a shading correction, a gamma correction, a chromatic aberration correction, an MTF (Modulation Transfer Function) correction and a scanner color correction with respect to an image data which is converted to the digital format in the A/D converter 13. For this purpose, the input image processing portion 60 includes line memories 61 for a plurality of lines (line denotes a column of pixels along the main scanning direction). Further, the input image processing portion 60 includes an abnormality determining portion 62 to realize a characteristic operation described hereinafter. The image memory 70 is a recording medium for storing an image data to which a processing by the input image processing portion 60 is completed and includes an unillustrated RAM (Random Access Memory), a flash ROM (Read Only Memory), an HDD (Hard Disc Drive) or the like. The print image processing portion 80 is adapted for converting an image signal having a tone stored in the image memory 22 into a binary data for printing. The binarization is performed based on, for example, a known error proliferating method.

The printer section 300 is adapted for printing an image onto a recording member such as a recording paper and recording sheet based on an image data for printing outputted from the print image processing section 80. The operating section 75 is adapted for receiving various kinds of input operations to realize a scanner function, a printer function and a copying function using the both as desired by a user. For this purpose, the operating section 75 includes various kinds of keys such as numerical keys and one-touch keys. A content of instruction inputted by a user by operating the operating section 75 is transmitted to the controller 400 as a data.

The controller 400 includes a CPU (Central Processing Unit) 40, a ROM (Read Only Memory) 42 for storing a program of determining an operation of the CPU and a RAM (Random Access Memory) 41 as a main memory device for storing a program at the time of operation and temporarily keeping a data. Namely, the controller 400 is constructed as a computer. Accordingly, the controller 400 performs an overall control over the image reading device 500 in correspondence with a content of instruction received in the operating section 75 and detection data transmitted from a sensor provided in respective parts of the image reading device 500. It should be especially noted that the controller 400 controls the moving frame driving portion 31 and the light adjusting circuit 32 base on a detection data transmitted from the abnormality determining portion 62.

Figure 4:
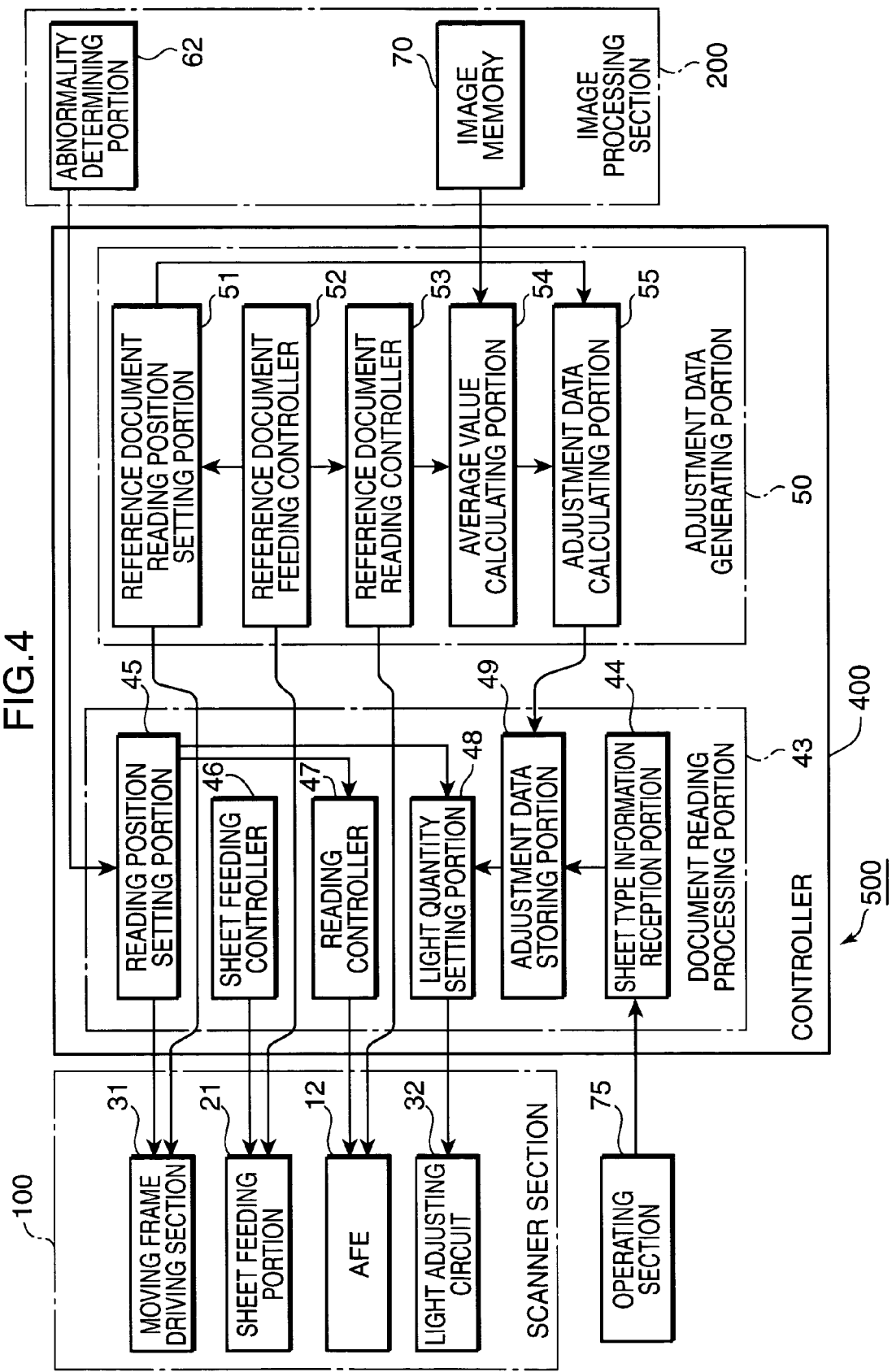
FIG. 4 is a block diagram showing a construction of a controller in FIG. 3.

FIG. 4 is a block diagram showing a construction of the controller 400 mainly focusing on characteristic functions. The controller 400 includes a document reading processing portion 43 and an adjustment data generating portion 50. The document reading processing portion 43 is adapted for controlling the scanner section 100 to read an image of the document 90 and includes a sheet type information reception portion 44, a reading position setting portion 45, a sheet feeding controller 46, a reading controller 47, a light quantity setting portion 48 and an adjustment data storing portion 49. On the other hand, the adjustment data generating portion 50 is adapted for generating an adjustment data used by the document reading processing portion 43 and includes a reference document reading position setting portion 51, a reference document feeding controller 52, a reference document reading controller 53, an average value calculating portion 54 and an adjustment data calculating portion 55. Operations of the respective portions realizing remarkable operations of the controller 400 are described in the following descriptions of operation with reference to a flow chart. It should be noted that the light quantity setting portion 48 corresponds to one example of the sensitivity setting portion of the present invention, and both the average value calculating portion 54 and the adjustment data calculating portion 55 are examples of the adjustment data generating portion of the present invention.

A program for realizing each of the above-described functions is read out by the computer as the controller 400 and stored in a non-volatile and high-capacity external storage device such as an HDD (unillustrated). The program is desirably transferred to a main storage device such as the RAM 41 so that it can be also executed by a CPU 40. The program can be supplied through a recording medium such as the ROM 42 or an unillustrated CD-ROM or can be supplied through a transmission medium such as a network connected to an unillustrated interface. The transmission medium is not limited to a wired transmission medium but may be a wireless transmission medium. Further, the transmission medium includes not only a communication line but also a relaying device such as a router for relaying the communication lines.

In the case where the program is supplied through the ROM 42, the program can be executed by the CPU by mounting to the controller 400 the ROM 42 in which the program is stored. In the case where the program is supplied through the CD-ROM, the program can be executed by the CPU 40 by connecting a CD-ROM reading device to the interface (unillustrated) and temporarily storing the program in the HDD (unillustrated). Further, in the case where the program is supplied through the transmission medium, the program can be executed by temporarily storing the program received through the interface (unillustrated) to the HDD (unillustrated).

Figure 5:
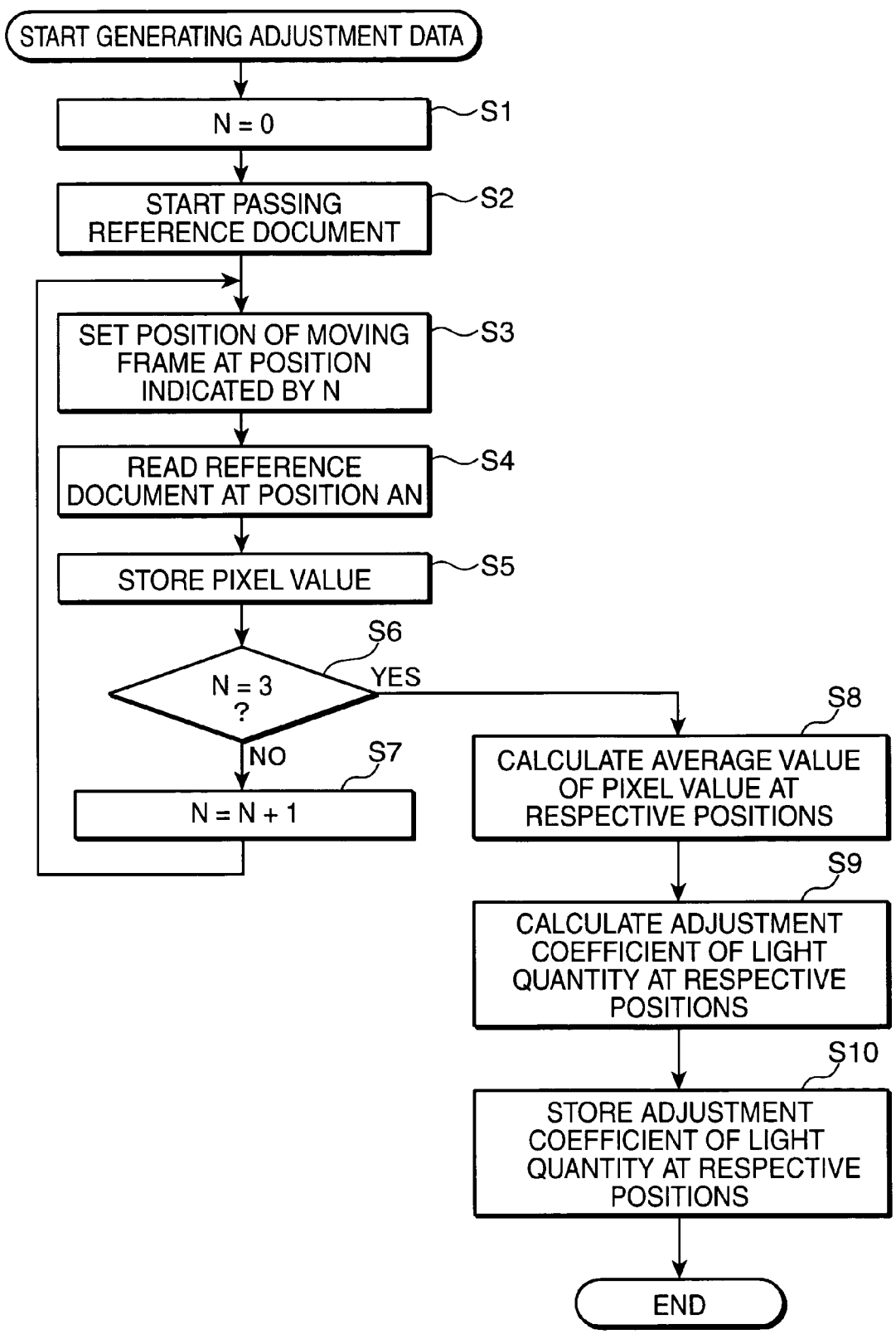
FIG. 5 is a flow chart showing steps of generating an adjustment data performed by an adjustment data generating portion in FIG. 4.
Figure 6A:
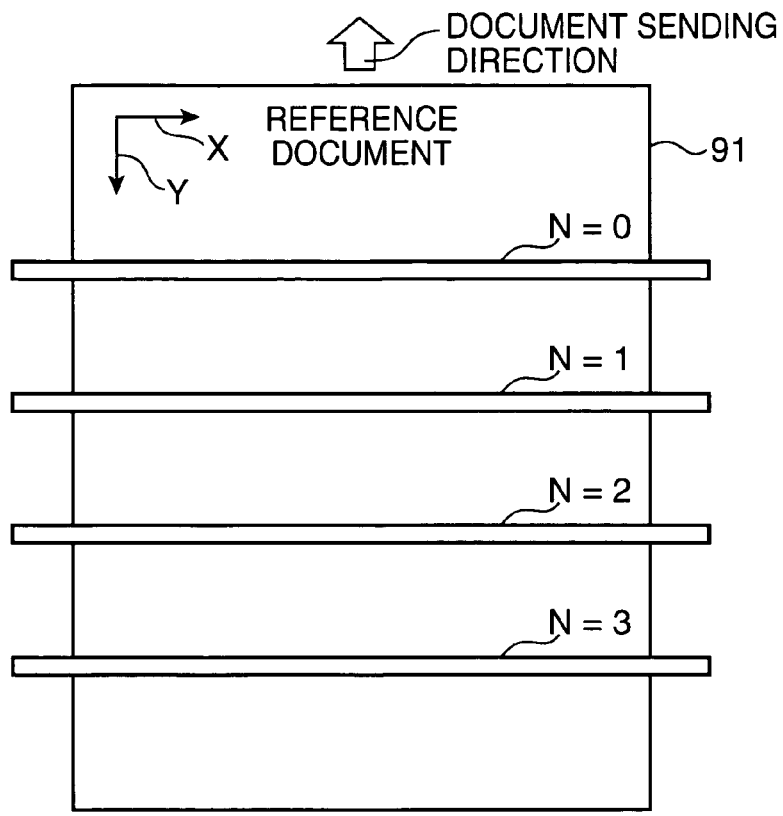
FIGS. 6A and 6B are explanatory diagrams for describing an operation of the adjustment data generating portion in FIG. 4.
Figure 6B:
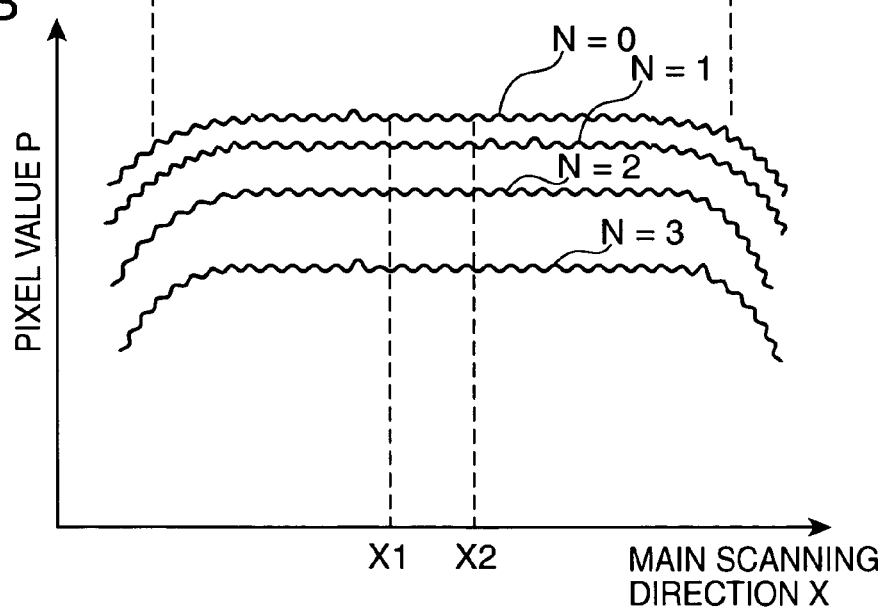

FIG. 5 is a flow chart showing steps of generating an adjustment data made by an adjustment data generating portion 50. Further, FIGS. 6A and 6B are explanatory diagrams for describing an operation of the adjustment data generating portion 50. To generate the adjustment data, a user prepares a reference document 91 and put it on a document feeding-in table 2. Then, a user operates the operating section 75 to instruct generation of the adjustment data. Accordingly, the adjustment data generating portion 50 is booted, and the adjustment data generating processing is started.

When the processing is started, the reference document reading position setting portion 51 sets a variable N to be an initial value of "0" (Step S1). The variable N is an integral number within a range between "0" to "3", each indicating a respective position between A0 to A3 as a document reading position 36. Next, the reference document feeding controller 52 starts conveying the reference document 91 through the sheet feeding portion 21 (Step S2). Then, the reference document reading position setting portion 51 controls the moving frame driving portion 31 to set the document reading position 36 to be a position indicated by the variable N (Step S3). Accordingly, if the variable N is "0", the document reading position 36 is set to be the position A0.

Next, the reference document reading controller 53 makes the scanner section 100 read 1 or more lines of the reference document at the position AN by performing ON/OFF control over the AFE 12 (Step S4). The read image is transferred from the scanner section 100 to the image processing section 200 and stored in the image memory 70 (Step S5). Then, the reference document reading position setting portion 51 determines whether or not the variable N is the final value of "3" (Step S6). In the case where the variable N is not "3", namely, the case where the variable N is any one of "0" to "2", the reference document reading position setting portion 51 increments the variable N by "1" (step S7). Thereafter, the process goes back to the Step S3.

Namely, until the variable N is determined to be "3" in the Step S6, a loop of the steps S3 through S7 is repeated. Accordingly, as shown in FIG. 6A, during when one sheet of the reference document 91 is conveyed, an image of the reference document 91 is read out at four different document reading positions 36 corresponding to the variables N=0 through N=3. Since the timing of reading out an image of the reference document 91 differs among the four different document reading positions 36, an image is read out at four portions along the sub-scanning direction Y of the reference document 91. The reference document 91 has, for example, single white color and has an even color at least in the sub-scanning direction Y. Therefore, that an image is read out at different positions along the sub-scanning direction Y on the reference document 91 does not cause difference in density, i.e. a pixel value P, of the obtained image. Namely, difference in the obtained pixel values P exclusively reflects the difference in the document reading positions 36.

If it is determined in the Step S6 that the variable N is the final value of "3", the process is shifted to Step S8. At this time, as shown in a graph of FIG. 6B, four kinds of pixel values P along the main scanning direction X are obtained correspondingly to the four document reading positions 36 and stored in the image memory 70. Preferably, the initial position A0 is set at the position where the reading sensitivity is the highest. Namely, the initial position A0 is set to be a position set in a conventional known sheet-through type image reading device. In this case, since the document sheet is curled on the contact glass 30, the reading sensitivity is lowered as the document reading position 36 is set far apart from the initial position A0. Consequently, as shown in FIG. 6B, the pixel value P is the highest at the initial position A0 and is lowered as moving away from the position A0 to A3.

In the Step S8, the average value calculating portion 54 calculates an average value of the pixel values P for the respective document reading positions 36. As shown in FIG. 6B, the calculation of the average value is performed, for example, in a partial area along the main scanning direction X. In an example of the FIG. 6B, the partial area is set to be within a range between a position X1 and X2 corresponding to a central part in the main scanning direction X. It is preferable that the range is set to be more than one-third of a width of the reference document 91 in the main scanning direction X. For example, the width is set to be 50 mm. Next, the adjustment data calculating portion 55 generates the adjustment data based on the calculated average value.

FIGS. 7A through 7C are explanatory diagrams for describing an operation of the adjustment data generating portion 50 in processes of Steps S9 and S10. When the average value P which decreases in accordance with increase in the variable N as shown in FIG. 7A is obtained, an adjustment coefficient C which increases so as to compensate for the decrease in the average value P can be obtained. The adjustment coefficient C indicates a ratio of increase in a light quantity of the exposure lamp 28 by the adjustment. Namely, the adjustment data calculating portion 55 determines the adjustment coefficient C so as to match the average value P with the value in the initial position A0.

Next, the adjustment data calculating portion 55 allocates the calculated adjustment coefficient C in relation with the corresponding document reading position 36 and stores the same in the adjustment data storing portion 49 in a form of a table. FIG. 7C is an explanatory drawing showing the adjustment data stored in the adjustment data storing portion 49. As shown in the FIG. 7C, the adjustment data is generated respectively concerning a different sheet type by performing a process shown in FIG. 5 with respect to the reference document 91 prepared separately in accordance with a plurality of types of the document 90 and can be stored in the adjustment data storing portion 49. When the process in Step S10 is completed, the process shown in FIG. 5 is completed.

Figure 8:
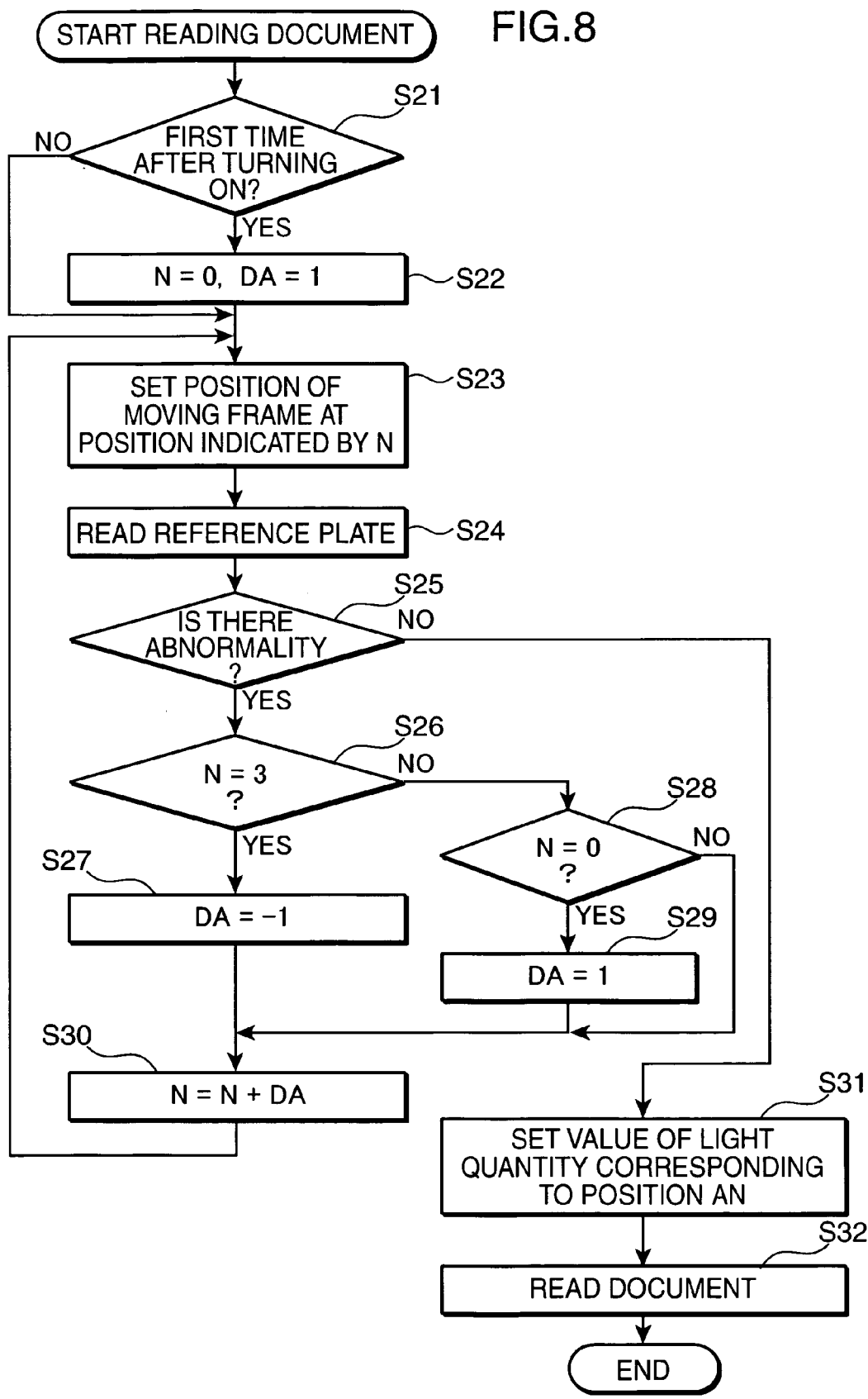
FIG. 8 is a flow chart showing steps of a document image reading process performed by the document reading processing portion in FIG. 4.

FIG. 8 is a flow chart showing steps of the document image reading process performed by the document reading processing portion 43. When a user instructs reading of the document 90 by operating the operating section 75, a process of FIG. 8 is started. When the process is started, the reading position setting portion 45 determines whether or not the document reading process is performed at first time after a power source of the image reading device 500 is turned on (Step S21). If it is determined that the document reading process is performed at the first time after the power source is turned on ("Yes" in Step S21), the reading position setting portion 45 sets the variable N to be "0" and sets a variable DA to be "1" (Step S22). Similarly to the variable N in FIG. 5, an integral number is chosen among "0" to "3" for the variable N correspondingly to the four positions A0 to A3 of the four document reading positions 36. On the other hand, if it is determined that the document reading process is not the one performed at the first time after the power source is turned on ("NO" in Step S21), the reading position setting portion 45 holds the variable N to be the value which has already been set.

Next, the reading position setting portion 45 controls the moving frame driving portion 31 so as to set the document reading position 36 at a position indicated by the variable N (Step S23). Accordingly, if the variable N is "0", the document reading position 36 is set to be at the position A0 which is the initial position. In the case where the document reading position 36 is already at the position indicated by the variable N, it would be enough to merely maintaining the present position in the process in the Step S23.

Next, the reading controller 47 makes the scanner section 100 read one line of the reference plate 26 (Step S24) by performing ON/OFF control over the AFE 12. The read image is transmitted to the image processing section 200. Then, the abnormality determining portion 62 of the image processing section 200 determines whether or not an abnormal image is included in the read image (Step S25).

Figure 9A:
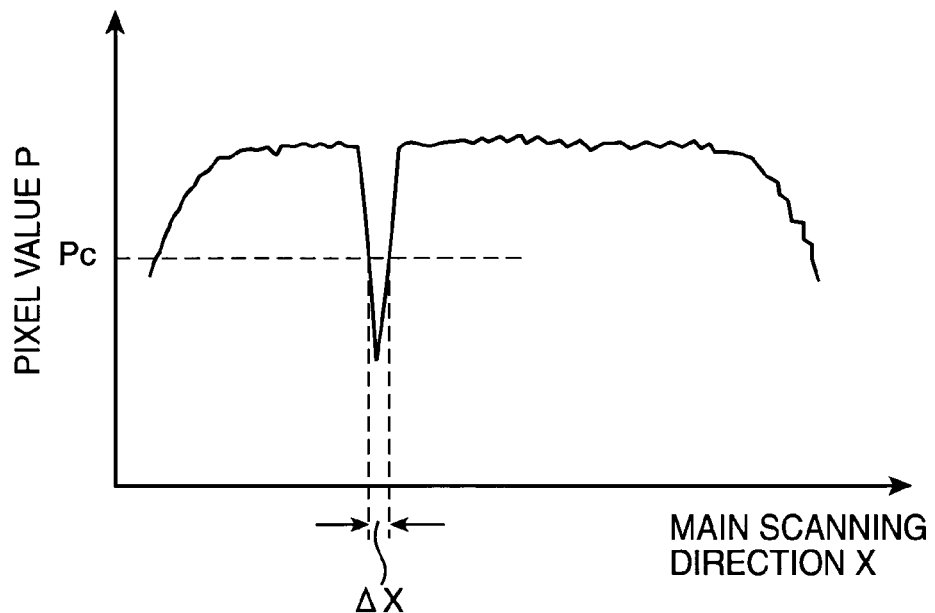
FIGS. 9A through 9C are operational explanatory diagrams for describing an operation of an abnormality determining portion which determines whether or not there exists an abnormal image.
Figure 9B:
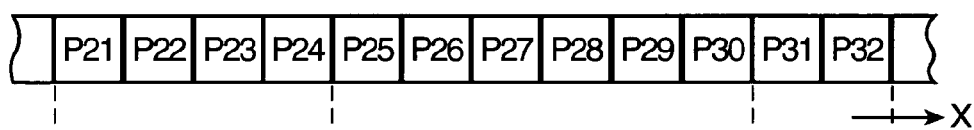
Figure 9C:
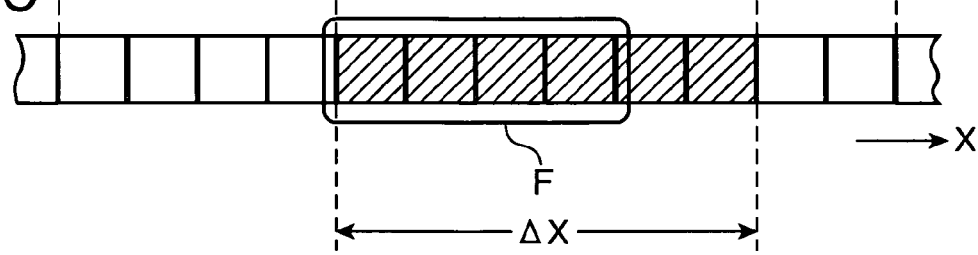

FIGS. 9A through 9C are operational explanatory diagrams for describing an operation of the abnormality determining portion 62 which determines whether or not an abnormal image exists. In examples in FIG. 9, one line of an image of the reference plate 26 is read out. In the case where a foreign matter having a size larger than a predetermined size so as to cause a linear abnormal image to be appeared on a read image of the document 90 is attached on the contact glass 30, a deep recession having a width larger than a predetermined size appears in a distribution of the pixel value P along the main scanning direction X as exemplified in FIG. 9A. The abnormality determining portion 62 determines that an abnormal image exists in the case where a width ΔX in the area where the pixel value P is lower than the predetermined reference value Pc is over a reference width. In the case where a resolution is 600 pixels per inch, the reference width is set to be 10 pixels.

The abnormality determining portion 62 applies arithmetic processing to one line of the pixel values P temporarily retained in one line memory 61 as shown in FIG. 9B and converts the respective pixel values to a value of "1" or "0" based on whether or not the pixel value P is lower than the reference value Pc. FIG. 9C shows values of respective pixels after the conversion. A portion to which a hatching is applied indicates a pixel having the pixel value "1", and a portion to which a hatching is not applied indicates a pixel having the pixel value "0". In the example of FIG. 9C, pixel values after the conversion are "1" in the width ΔX including six pixels. The abnormality determining portion 62 applies an operator F with respect to pixels after the pixel value conversion exemplified in FIG. 9C while moving the pixel position in order. The operator F is adapted for calculating a logical multiplication of pixel value of a pixel column (pixel column of four pixel width in FIG. 9C) to which a pixel is added to the reference width (three pixel width in FIG. 9C). Accordingly, the abnormality determining portion 62 determines whether or not there exists an area where the pixel value is lower than the reference value Pc in a width wider than the reference width (namely, more than four pixels in FIG. 9C). If a value of the result of applying the operator F is "1" in at least one portion, the abnormality determining portion 62 determines that there exists the area i.e. the abnormal image.

When the abnormality determining portion 62 identifies existence of the abnormal image ("YES" in Step S25), the reading position setting portion 45 determines the value of the variable N (Steps S26 and S28). If the variable N is "0" ("NO" in Step S26, "YES" in Step 28), the reading position setting portion 45 sets the variable "DA" to be "1" (Step S29). If the variable N is "1" or "2" ("NO" in Steps S26 and S28), the variable DA is retained. If the variable N is "3" ("YES" in Step S26), the variable DA is set to be "−1" (Step S27). Then, the reading position setting portion 45 adds the variable DA to the variable N (Step S30). Thereafter, the process goes back to Step 23.

Namely, until it is determined in Step S25 that there exists no abnormal image, the variable N is repeatedly changed in a range between "0" to "3" in an order of 0, 1, 2, 3, 2, 1, 0, 1, 2 . . . Accordingly, the document reading position 36 is changed among the positions A0 to A3. When it is determined in Step S25 that there exists no abnormal image, the light quantity setting portion 48 reads out the adjustment coefficient corresponding to the document reading position 36 indicated by the variable N from the adjustment data storing portion 49 and controls the light adjusting circuit 32 in accordance with the adjustment coefficient C. Accordingly, light quantity of the exposure lamp 28 is regulated. In the case where a plurality of adjustment data corresponding to a plurality of types of recording sheet are stored in the adjustment data storing portion 49 as exemplified in FIG. 7C, the light quantity setting portion 48 selects the adjustment data which the sheet type information reception portion 44 receives in accordance with a type of a sheet of the document 90. To the sheet type information reception portion 44, for example, information indicating a type of sheet which a user inputs through the operation section 75 is inputted.

Next, the sheet feeding controller 46 makes the sheet feeding portion 21 start up so as to start feeding the document 90. During when the document 90 is fed, the reading controller 47 makes the scanner section 100 read an image of the document 90 by performing an ON/OFF control over the AFE 12. When the entire document 90 put on the document feeding table 2 is completed, the process shown in FIG. 8 is completed.

As described above, the image reading device 500 according to the present embodiment suppresses changes of image quality of an image obtained by reading the document 90 while suppressing occurrence of the linear abnormal image.

In the above-described embodiment, the light quantity of the exposure lamp 28 is adjusted to increase so as to compensate for the decrease in reading sensitivity according to the change of the document reading position 36 from the initial position A0. With regard to this, the reading sensitivity can be adjusted by adjusting the gain of the AFE 12, namely, by adjusting the gain of an image signal which is obtained by reading an image of the document. In this case, sensitivity in a wide area can be adjusted easily. Further, the gain of the AFE 12 and the light quantity of the exposure lamp 28 can be adjusted at the same time. Namely, the gain of the image signal obtained by reading the image of the document and the light quantity of the light source can be adjusted at the same time so as to adjust the reading sensitivity. In this case, the adjustment of sensitivity in wide area can be performed easily in a preferable use area of the AFE 12 and the exposure lamp 28. Generally, as long as the intensity, i.e. the pixel value, of the image obtained by a predetermined document is adjusted, the compensation of the reading sensitivity may be accomplished. However, in the above-described embodiment where the light quantity of the exposure lamp 28 is adjusted, even if the document reading position 36 is changed from the initial position A0, an advantage that a dynamic range of the read image can be maintained wide and the S/N ratio can be maintained high can be obtained.

In the above-described embodiment, the light quantity of the exposure lamp 28 is adjusted to increase so as to compensate for a decrease in reading sensitivity in accordance with a change in the document reading position 36 from the initial position A0. With regard to this, as long as the decrease in the reading sensitivity is not compensated but can be reduced, the effect of suppressing changes in image quality can be obtained properly.

In the above-described embodiment, the adjustment data is formed in a format allocating the document reading position 36 in relation with the adjustment coefficient C and is stored in the adjustment data storing portion 49. With regard to this, the adjustment data may be a functional data capable of leading the adjustment coefficient C corresponding to each document reading position 36. For example, a function which is identical or approximate to a curved line shown in FIG. 7B may be lead by a polynomial equation so as to set the adjustment data. The adjustment data calculating portion 55 expresses the function as a function having not only the variable N of an integral number but also an actual number so that the reading position setting portion 45 can set the document reading position 36 not only at predetermined positions among A0 to A3 but also at desirable positions. Accordingly, the light quantity setting portion 48 can determine the adjustment coefficient C corresponding to a predetermined desirable position based on the adjustment data. However, in the above embodiment where the adjustment data is generated in the form of table in which the document reading position 36 and the adjustment coefficient C are allocated in relation with each other, the adjustment data has a simple structure. Accordingly, the adjustment data calculating portion 55 can obtain the advantage that the adjustment data is generated expeditiously. Additionally, the advantage that the light quantity setting portion 48 can obtain the adjustment coefficient corresponding to the document reading position 36 expeditiously without calculation can be obtained.

In the above embodiment, the adjustment data can be generated and stored in the adjustment data storing portion 49 by the function of the adjustment data generating portion 50. With regard to this, the adjustment of light quantity may be performed without the adjustment data generating portion 50. The adjustment of light quantity may be performed by the adjustment data which is stored in the adjustment data storing portion 49 at the time of a factory shipment of the image reading device 500. However, in the above-described embodiment having the adjustment data generating portion 50, a user or a maintenance person can generate the adjustment data after the user purchases the image reading device 500 and setting the same in a room, or the adjustment data generated in advance at the time of factory shipment and stored in the adjustment data storing portion 49 can be renewed. Accordingly, the adjustment can be performed correspondingly to the changes in reading sensitivity due to a passage of time and to a special type of sheet which a user individually uses.

In the above-described embodiment, as shown in FIG. 6A, when the adjustment data is generated, a movement of the document reading position 36 is completed during when one sheet of the reference document 91 is fed. With regard to this, the movement of the document reading position 36 may be completed during when a plurality of the same type of reference document 91 are prepared or one sheet of the reference document 91 is conveyed in a plurality of times. However, in the above embodiment in which the movement of the document reading position 36 is completed in the process of feeding one sheet of the reference document 91, it would be enough that a user supplies only one sheet of the reference document 91 only once to generate the adjustment data. Further, since the adjustment data is generated under the same feeding condition based on the same reference document 91, the adjustment data with high precision can be obtained.

In the above-described embodiment, as shown in FIG. 9B, a reading line width at the time when the scanner section 100 reads the reference plate 26 is set to be one line. With regard to this, if the CCD image capturing devices 11 are arranged in a plurality of lines and the reading of the document 90 is performed at the same time in a plurality of lines accordingly, it is preferable that the reading of the reference plate 26 is performed in the same plurality of lines. In this case, it is preferable that the abnormality determining portion 62 makes the operator F shown in FIG. 9C move across the plurality of lines and determines existence of the abnormal image in accordance with whether or not the pixel position where the result of calculation becomes the value "1" exists. Alternatively, the operator F may be enlarged also in the sub-scanning direction within an area visually smaller than the size which can be identified as the abnormal image so as to determine whether or not the pixel position where the calculation result has the value of "1".

As described above, an image reading device according to an embodiment of the present invention is adapted for reading an image of a document so conveyed as to move in a sub-scanning direction on one principal surface of a transparent plate at the other principal surface side of the transparent plate by a reflected light ray of a light source and includes: a reference plate provided facing the one principal surface of the transparent plate, and extending in a main scanning direction; an abnormality determining portion for determining whether or not there is an abnormality in an image that is obtained by reading the reference plate without conveying a document; a reading position setting portion for changing a document reading position along the sub-scanning direction within a range allowing reading of the reference plate when the abnormality determining portion determines that there is an abnormality; an adjustment data storing portion for storing an adjustment data to compensate a difference in the reading sensitivity due to a different document image reading position; and a sensitivity setting portion for adjusting the reading sensitivity in accordance with the document reading position based on the adjustment data.

According to this construction, the document image reading position is changed along the sub-scanning direction when an abnormality is identified in an image read out from the reference plate. Accordingly, appearance of white or black linear abnormal image in an image obtained by reading a document due to an attachment of foreign matter to the transparent plate can be avoided. Further, a change in the document reading position is performed within an area where the reference plate can be read out. Accordingly, the reference plate is read out again in the document reading position after being changed to determine existence of an abnormality. When an abnormality is identified, the document reading position can be further changed including a movement of moving back to the initial position. Further, the adjustment data for compensating a difference in the reading sensitivity due to a change in the document reading position is stored in advance in the adjustment data storing portion. Accordingly, the reading sensitivity is adjusted based on the adjustment data in accordance with a change in the document reading position so that a change in image quality due to a change in the document reading position is suppressed.

The adjustment data may be an assembly of numeric values for adjustment corresponding to each document reading position and may be a functional data capable of leading the numeric values.

It is preferable that the sensitivity setting portion adjusts the reading sensitivity by regulating the light quantity of the light source.

In this case, the reading sensitivity is adjusted by regulating the light quantity of the light source. Accordingly, even if the document reading position differs, a dynamic range of the read image can be maintained wide and the S/N ratio can be maintained high.

The reading sensitivity is evaluated by an intensity i.e. pixel values of an image obtained from a predetermined image and depends on the light quantity of the light source and a gain of an electric signal obtained by a photoelectric conversion. The reading sensitivity can be adjusted by adjusting any of these.

It is preferable that the image reading device further includes a sheet type information reception portion for receiving information concerning a sheet type of a document, wherein: the adjustment data storing portion stores adjustment data respectively concerning a different sheet types, and the sensitivity setting portion adjusts the reading sensitivity based on the adjustment data corresponding to the sheet type specified by the information received by the sheet type information reception portion.

In this case, the adjustment data is stored respectively concerning a different sheet types, and the reading sensitivity is adjusted based on the adjustment data corresponding to the sheet type specified by the inputted information. Further, the sheet type information reception portion is adapted for receiving information inputted by operation of a user.

It is preferable that the reading position setting portion changes the document reading position among a plurality of predetermined positions along the sub-scanning direction when the abnormality determining portion determines that there is an abnormality, and the adjustment data storing portion stores the adjustment data in the form of a table in which adjustment values are allocated in relationship with the plurality of predetermined positions.

In this case, when the reference plate is read out and an abnormality is identified in the read image, the document reading position is changed among a plurality of predetermined positions along the sub-scanning direction. Accordingly, the stored adjustment data is stored in the form of a table in which adjustment values are allocated in relation with the plurality of predetermined positioned. Accordingly, the adjustment data is simple and the adjustment of the reading sensitivity is performed expeditiously by reading the corresponding numeric values.

It may be so constructed that the reading position setting portion changes the document reading position among a plurality of predetermined positions along the sub-scanning direction when the abnormality determining portion determines that there is an abnormality, and that the adjustment data storing portion stores the adjustment data in the form of a functional data capable of leading adjustment values to the respective document reading positions.

In this case, the document reading position is predetermined in an optional position, and the adjustment coefficient corresponding to the predetermined optional position can be determined based on the functional data. Accordingly, the reading sensitivity at the most appropriate position in a surface of the transparent plate for reading out an image can be adjusted.

It is preferable that the image reading device further includes a document feeding portion for feeding a document over the one principal surface of the transparent plate while bending the document back at a roller so that a document feeding-in position and a document feeding-out position are approximately overlapping.

In this case, as adapted in many of conventionally known sheet-through type image reading devices, the document feeding portion feeds a document over the one principal surface of the transparent plate while bending the document back at a roller so that the document feeding-in position and a document feeding-out position are approximately overlapping. Accordingly, a document feeding passage from the feeding-in position to the feeding-out position does not extend in one direction along the principal surface of the transparent plate so that the image reading device becomes compact. Since the document is fed on the one principal surface of the transparent plate while being bent back at the roller, the document is moved on the one principal surface of the transparent plate while being curved. Accordingly, when the document reading position is changed, the distance and the angle of the document sheet with respect to the principal surface of the transparent plate is changed. Conventionally, it causes a result that the reading sensitivity is changed sensitively depending upon the document reading position. In the present construction, the reading sensitivity is adjusted in accordance with the document reading position so that the image quality which is changed sensitively may be suppressed from changing.

It is preferable that the image reading device further includes: a reference document reading position setting portion for moving the document reading position along the sub-scanning direction when a reference document is fed; and an adjustment data generating portion for generating adjustment data based on reference document images obtained by reading the reference document at different document image reading positions along the sub-scanning direction, and storing the same in the adjustment data storing portion.

In this case, when the reference document, e.g. a document on which nothing is printed thereon, which is a document for being a reference for measuring the reading sensitivity is fed, the document reading position is moved. Accordingly, the adjustment data is generated and stored in the adjustment data storing portion. Therefore, after purchasing and setting the image reading device, a user or a maintenance person can generate the adjustment data or renew the same. Accordingly, the adjustment can be performed correspondingly to the changes in the reading sensitivity due to a passage of time. Further, the adjustment can be performed correspondingly to a type of document sheet which a user individually uses. It is preferable that a movement of the document reading position is completed in the process of feeding one sheet of the reference document. However, the document reading position may be changed in the process of feeding a plurality of document sheets.

It is preferable that the reference document reading position setting portion completes the movement of the document reading positions during the time when the single one reference document is being fed.

In this case, the movement of the document reading position is completed during the time when the single one reference document is being fed. Accordingly, it would be enough that a user feeds only one reference document so that workability is improved. Further, since the adjustment data is generated based on the same reference document, the adjustment data having high accuracy can be obtained.

It is preferable that the abnormality determining portion determines that there is an abnormality when a foreign matter having a predetermined reference length is attached to the reference plate, and the reading position setting portion changes the document reading position a distance longer than the predetermined reference length when the abnormality determining section determines that there is an abnormality.

In this case, when a foreign matter having a predetermined reference length is detected, the document reading position is changed to a position where the foreign matter is not attached. Accordingly, the document can be assuredly read out by using a portion of the transparent plate where the foreign matter is not attached.

This application is based on patent application No. 2005-288917 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image reading device for reading an image of a document so conveyed as to move in a sub-scanning direction on one principal surface of a transparent plate at the other principal surface side of the transparent plate by a reflected light ray of a light source, comprising:
    a reference plate provided facing the one principal surface of the transparent plate, and extending in a main scanning direction;
    an abnormality determining portion for determining whether or not there is an abnormality in an image that is obtained by reading the reference plate without conveying a document;
    a reading position setting portion for changing a document reading position along the sub-scanning direction within a range allowing reading of the reference plate when the abnormality determining portion determines that there is an abnormality;
    an adjustment data storing portion for storing an adjustment data to compensate a difference in the reading sensitivity due to a different document image reading position;
    a sensitivity setting portion for adjusting the reading sensitivity in accordance with the document reading position based on the adjustment data; and
    a sheet type information reception portion for receiving information concerning a sheet type of a document, wherein:
    the adjustment data storing portion stores adjustment data respectively concerning a different sheet types, and
    the sensitivity setting portion adjusts the reading sensitivity based on the adjustment data corresponding to the sheet type specified by the information received by the sheet type information reception portion.

2. An image reading device according to claim 1, wherein the sensitivity setting portion adjusts the reading sensitivity by regulating the light quantity of the light source.

3. An image reading device according to claim 1, wherein the sensitivity setting portion adjusts the reading sensitivity by regulating the gain of an image signal obtained by reading an image of a document.

4. An image reading device according to claim 1, wherein the sensitivity setting section adjusts the reading sensitivity by regulating both the gain of an image signal obtained by reading an image of a document and the light quantity of the light source.

5. An image reading device according to claim 1, wherein:
    the reading position setting portion changes the document reading position among a plurality of predetermined positions along the sub-scanning direction when the abnormality determining portion determines that there is an abnormality, and
    the adjustment data storing portion stores the adjustment data in the form of a table in which adjustment values are allocated in relationship with the plurality of predetermined positions.

6. An image reading device according to claim 1, wherein:
    the reading position setting section changes the document reading position among a plurality of predetermined positions along the sub-scanning direction when the abnormality determining portion determines that there is an abnormality, and
    the adjustment data storing portion stores the adjustment data in the form of a functional data capable of leading adjustment values to the respective document reading positions.

7. An image reading device according to claim 1, further comprising a document feeding portion for feeding a document over the one principal surface of the transparent plate while bending the document back at a roller so that a document feeding-in position and a document feeding-out position are approximately overlapping.

8. An image reading device according to claim 1, wherein:
    the abnormality determining section determines that there is an abnormality when a foreign matter having a predetermined reference length is attached to the reference plate, and
    the reading position setting section changes the document reading position a distance longer than the predetermined reference length when the abnormality determining section determines that there is an abnormality.

9. An image reading device for reading an image of a document so conveyed as to move in a sub-scanning direction on one principal surface of a transparent plate at the other principal surface side of the transparent plate by a reflected light ray of a light source, comprising:
    a reference plate provided facing the one principal surface of the transparent plate, and extending in a main scanning direction;
    an abnormality determining portion for determining whether or not there is an abnormality in an image that is obtained by reading the reference plate without conveying a document;
    a reading position setting portion for changing a document reading position along the sub-scanning direction within a range allowing reading of the reference plate when the abnormality determining portion determines that there is an abnormality;
    an adjustment data storing portion for storing an adjustment data to compensate a difference in the reading sensitivity due to a different document image reading position;

a sensitivity setting portion for adjusting the reading sensitivity in accordance with the document reading position based on the adjustment data;

a reference document reading position setting portion for moving the document reading position along the sub-scanning direction when a reference document is fed; and an adjustment data generating portion for generating adjustment data based on reference document images obtained by reading the reference document at different document image reading positions along the sub-scanning direction, and storing the same in the adjustment data storing portion.

10. An image reading device according to claim 9, wherein the reference document reading position setting portion completes the movement of the document reading positions during the time when the single one reference document is being fed.

* * * * *